United States Patent [19]

Willingham et al.

[11] Patent Number: 5,562,373
[45] Date of Patent: Oct. 8, 1996

[54] COOLANT POWERED MACHINING

[76] Inventors: Melvin K. Willingham, 1932 Vista Oaks, Carrollton, Tex. 75007; Stephen T. Kugle, 1225 S. Pecan, Arlington, Tex. 76010

[21] Appl. No.: 269,700

[22] Filed: Jul. 1, 1994

[51] Int. Cl.[6] .............................. B23B 47/22; B23B 51/06
[52] U.S. Cl. ............................ 409/136; 279/156; 408/56; 408/146
[58] Field of Search .................................... 409/136, 232, 409/234; 408/56, 146, 238, 239 R; 279/4.01, 4.06, 16, 134, 135, 156

[56] References Cited

U.S. PATENT DOCUMENTS 4,642,005   2/1987   Kondo et al. .......................... 408/56

FOREIGN PATENT DOCUMENTS 2662104   11/1991   France .................................. 408/56
47-29839   8/1972   Japan .................................. 408/146
61-279408  12/1986   Japan .................................. 408/146
61-279407  12/1986   Japan .................................. 408/146
6-190613    7/1994   Japan .................................. 408/146

Primary Examiner—Daniel W. Howell

[57] ABSTRACT

A coolant pump supplies coolant flow to a part to be machined on a machine tool, and to a cutting tool holding device. In one embodiment the tool holder is part of a self compensating tool holding device which allows the cutting tool to float in position until the coolant supply forces a piston against a collet which grasp the tool holder in a fixed position. In a second embodiment, the tool holder is part of a device to cause linear motion of the cutting tool by using the coolant flow to force the piston shaped tool holder, and cutting tool thereon, through a cylindrical bore in a main body, and extend outward from the main body. In yet another embodiment, the tool holder is mounted to a hydraulic motor which uses the coolant flow to rotate the tool holder and cutting tool thereon.

7 Claims, 5 Drawing Sheets

COOLANT POWERED MACHINING

BACKGROUND

1. Field of the Invention

This is process relates to metal and non-metallic machining, specifically extending the capabilities of existing machine tools.

2. Description of the Related Art

Extending the capability of machine tools to provide a better return on capital investment is an industry within itself. The proliferation of add on devices such as tapping heads, speed increasers, probes, etc. is well documented. The means to power the accessories range from using the rotating spindle of the machine tool, air, and in some cases hydraulic power.

The rotating spindle power is the most common power source for accessories. The accessory is normally constructed with a rotary joint that allows the machine tool to provide rotary power input to the device while the main body of the device is held steady by means of a lever arm placed against a non-rotating surface of the machine tool. In many instances secondary operations such as light broaching will effect the capability of the machine tool to hold close tolerances while doing its primary work of milling, and drilling.

Shop air pressure has been used to power high speed, low power output rotary spindles in some applications. Typically an air turbine is attached to the spindle and an air supply hose is attached to shop air for power. The turbine rotates at high speed to machine aluminum and composites. The higher speed spindle allows smaller tools to operate closer to their recommended surface feed rates. Although air operated rotary spindles can develop high speed, they do not provide high torque and due to the compressibility of air, the spindle speed varies greatly with the cutting load. This has a severe impact on the costs of manufacturing because the inability to use the maximum machine tool feed rates increases machining time. The use of air power equipment for machine accessories has never progressed in the marketplace much beyond specialty air powered rotary spindles.

Attachable hydraulic spindles have been used in rare occasions to increase the speed of rotary machine tools. The hydraulic spindle uses conventional high pressure hydraulic pumps to power a turbine that is attached to the spindle of the machine tool. Hoses connect the pump to the attached turbine. These spindles provide high torque at relatively high speeds. The main objection to the use of hydraulics for powering accessories is that hydraulic systems tend to leak. Leaking hydraulic fluid can mix with the machine tool coolant, thereby contaminating the coolant supply and causing problems with separation and disposal of the coolant.

The use the of coolant flow to provide power at the spindle solves the problems of the other methods employed to power machine tool accessories. The coolant is available at the machine tool sump and commercially available pumps can be attached directly to the machine tool with little modification. The incompressibility of the liquid coolant affords higher power output than air powered devices and the problem of hydraulic oil powered devices contaminating the coolant is avoided.

All forms of motion can be produced with the coolant as a power source. Uses of this power source includes but are not limited by mechanisms that tap, countersink, drill, deburr, mill, and broach. One application for this technology has been prototyped, tested, and redesigned by the applicants. The device is used to allow the machine tool to make accurate countersinks, and blind holes from cast surfaces without probing the surface or changing the tool offsets.

For a more complete understanding of the above and other features of this technology, reference should be made to the following detailed description of a preferred embodiment and to the accompanying drawings.

SUMMARY

In one embodiment, the invention is a device used for automatically setting he length a cutting tool on a machine tool for machining a part. The device comprises a tool holder which is secured to the machine tool in a floating engagement and has a cutting tool secured to the tool holder, a means for using coolant flow to secure the tool holder in a fixed position relative to the machine tool, and a coolant pump for supplying coolant flow to the part being machined and the means for securing the tool holder.

This embodiment of the present invention comprises a main body, an end cap, a tool holder, a collet, a piston, a spring, and a coolant pump. The main body has a piston bore at a first end and a conical collet bore extending from the piston bore to a tool holder bore at a second end of the main body. The tool holder has a first diameter at a first end which is disposed within the main body, and a second diameter at a second end which slides into the tool holder bore in the main body. The second end of the tool holder extends from the main body and has a means for securing the cutting tool thereon. The collet has an outside taper which engages the conical bore of the main body and an internal diameter which engages the first diameter of the tool holder. The piston has an outside diameter adapted to slide within the piston bore of the main body. The spring is positioned between the tool holder and the piston, and applies opposing forces to those elements. The end cap attaches to the main body and closes off the cylinder bore of the main body. The end cap also attaches to the machine tool. A fluid passage in the end cap allows coolant from the coolant pump to the piston bore of the main body. As fluid accumulates in the main body, the piston is forced against the collet which causes the collet to grasp the first end of the tool holder, thereby grasping the tool holder in a fixed position relative to the main body. Coolant is also supplied by the coolant pump to the part which is to be machined by the machine tool.

In another embodiment, the coolant flow is used to move the cutting tool linearly relative to the part which is to be machined, and a coolant flow pump provides the means for moving the cutting tool. In yet another embodiment, the flow of coolant causes the cutting tool to rotate.

BRIEF DESCRIPTION OF THE DRAWINGS

For a more complete understanding of the present invention, and for further objectives and advantages thereof, reference may now be had to the following detailed description, taken in conjunction with the accompanying drawings, wherein.

DETAILED DESCRIPTION

Figure 1:
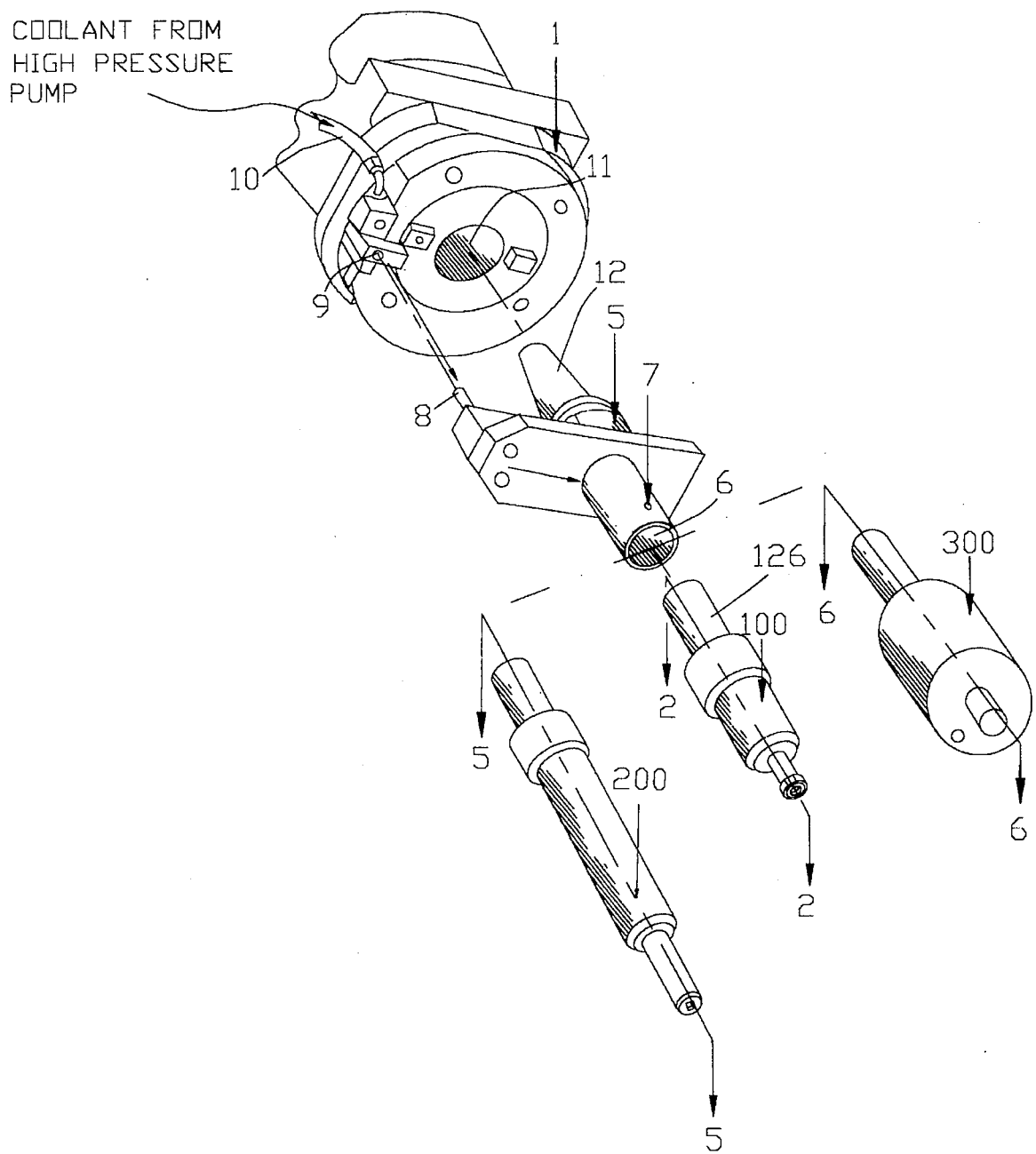
FIG. 1 is an exploded perspective view of the tooling used with the present invention powered by the coolant flow.

FIG. 1 shows a perspective view of a self compensating tool holder 100, a broaching attachment 200, and high speed spindle attachment 300, a through the spindle coolant adapter 5 such as a George Whalley adapter, and a typical machine tool spindle 1. The self compensating tool holder 100 automatically sets tool length from the part surface for countersinking, counter boring, blind hole drilling, etc. The broaching attachment 200 allows broaching operations to be performed with conventional CNC equipment without placing undue stress on the machine tool lead screws. The high speed spindle attachment 300 performs deburring operations, or metal removal operations using small diameter tools.

Still referring to FIG. 1, there is shown a typical embodiment for using coolant flow to power machine tool accessories. Coolant adapter 5 taper locating surface 12 locks into a machine tool spindle 1 receiving bore 11. A coolant adapter tubular boss 8 simultaneously locks into a coolant adapter block bore 9. In the instance where the machine tool provides a passage for coolant flow through the spindle the coolant adapter 5 may be replaced with a conventional tool holder that has a coolant passage. Self compensating holder 100, broaching attachment 200, or high speed spindle attachment 300 are held in a coolant adapter bore 6 by means of a set screw 7. High pressure coolant is pumped through a coolant adapter block hose 10, the coolant then flows out of coolant adapter block bore 9 into coolant adapter 5 tubular boss 8. Coolant is routed via internal passages in coolant adapter 5 to receiving bore 6. The coolant flows into self compensating holder 100, broaching attachment 200, or high speed spindle attachment 300, and provides power to actuate them. In a preferred embodiment the coolant pump is also used to supply coolant/lubricant to the edges of the cutting tool.

Figure 2:
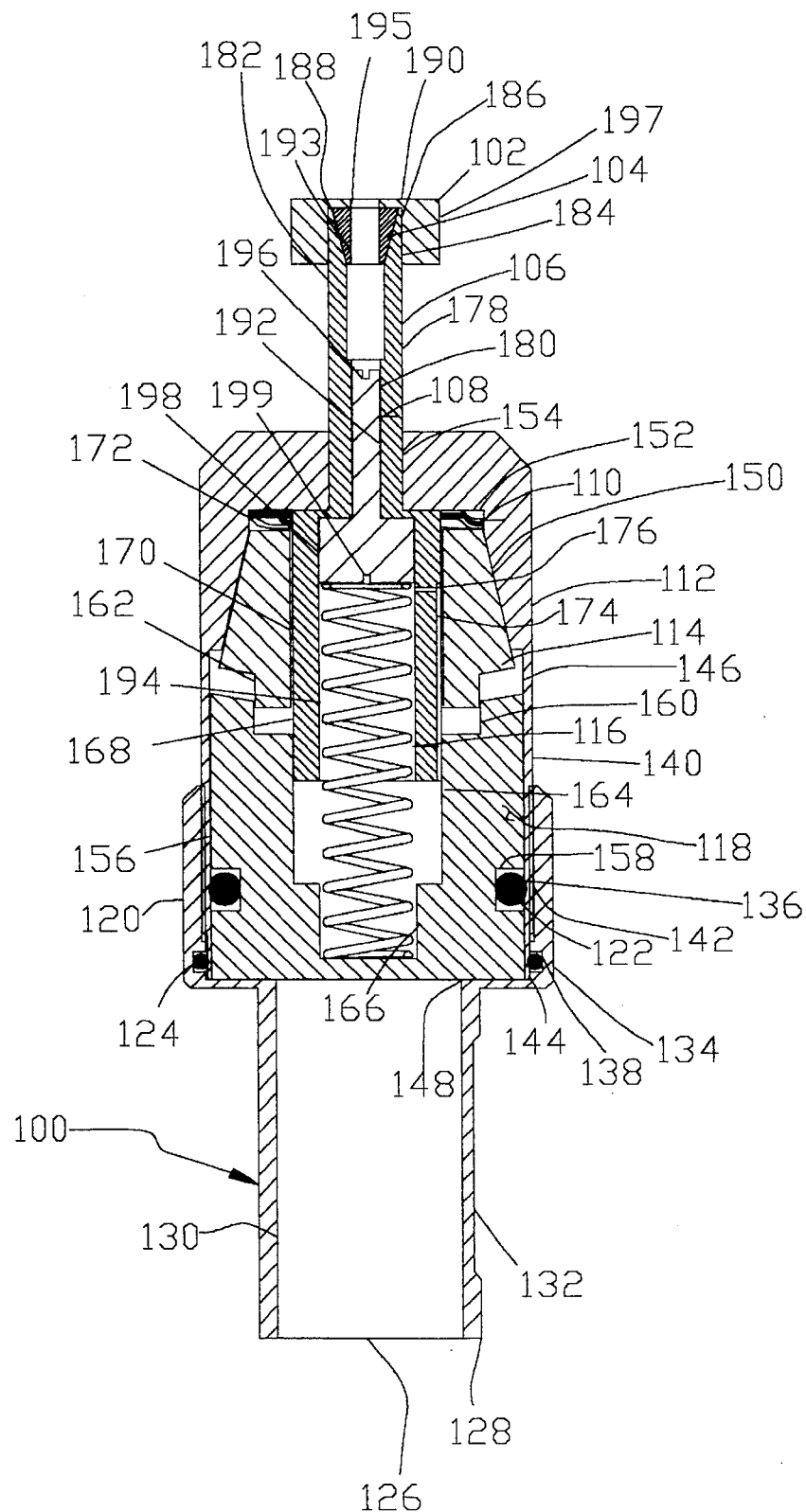
FIG. 2 is a side elevation sectional view of self compensating tool holder shown in FIG. 1.

Referring to FIG. 2 there is shown a side-elevation cross-sectional view of self compensating tool holder 100. There is shown an end cap 120, a main body 112, a tool holder 106, a locking collet 114, and a piston 118. As shown therein, there is end cap 120, which is preferably constructed from a corrosion resistant material having high tensile properties such as 303 stainless steel. At the aft end there is formed a tubular projection 126 with an outside diameter 128 that provides a slip fit into adapter 5 receiving bore 6 FIG. 1 and allows ingress and regress of the coolant to self compensating tool holder 100. The inside diameter 130 of tubular projection is of sufficient internal diameter to maximize coolant flow, but preferably maintaining a wall thickness capable of withstanding burst pressures such as 600 psi, and is of such a length to provide complete engagement into adapter 5 receiving bore 6 FIG. 1. The outside diameter has a longitudinal rectangular flat 132 that is parallel to the central axis of self compensating holder 100, and allows self compensating tool holder 100 to be securely held with the set screw 7 FIG. 1 in adapter 5. The flat starts preferably 0.500 from the aft end and long enough to allow the set screw 7 of adapter 5 to provide full distributed force across its complete face. Forward the end tube transitions to a larger diameter 134 that is of sufficient size to allow internal threads 136 to be formed without compromising structural integrity. Threads 136 are preferably of a length that will allow sufficient engagement to the main body 112 to provide adequate strength to withstand above mentioned pressures. There is an o-ring groove 138 located aft of threads 136 to provide sealing with the main body 112. 0-ring groove 138 will preferably follow generally accepted design procedures for hydraulic pistons and cylinders to ensure a leak proof seal between end cap 120 and main body 112. The surface finishes are preferably a maximum 125 (RMS) Root Mean Square micro inches on all surfaces other than the o-ring groove 138 which requires preferably a maximum 63 RMS micro inches.

Attached therein is a main body 112, which is generally formed with cylindrical dimensions. The main body 112 is preferably constructed from a corrosion resistant material having high tensile properties such as 303 stainless steel. There is an aft outside diameter 140 which has pin threads 142 that mechanically mate to end cap 120 internal threads 136. Aft of the threads 142 there is a cylindrical projection 144 that forms a compression fit with the internal sealing o-ring 124 in end cap 120. The surface finish of cylindrical projection is preferably a maximum 32 RMS to prevent damage during assembly. The main body 112 has a outside diameter 140 forward of the threads 142 of a length to allow a piston 118, collet 114 such as a Jacobs Rubber-Flex collet, preferably four finger springs 110 and tool holder 106 to be contained in the internal bores. The minimum wall thickness will be of such a thickness to preferably withstand minimum burst pressures of 600 psi. The piston bore 146 containing piston 118 is of a sufficient diameter to allow a sliding compression fit of the piston o-ring 122. This diameter preferably has a surface finish of 32 RMS. The length of the bore is of such a length to allow the piston to have sufficient movement to compress collet 114, and return to the reference position against surface 148 at the aft internal bore containing end cap 120 o-ring groove 138 after the coolant has been turned off. The piston bore 146 transitions into a conical collet bore 150. The taper of the bore matches the taper of collet 114 and extends to a length that allows collet 114 to protrude into the piston diameter enough to allow sufficient compression of the collet to lock tool holder 106 to preferably resist 750 pounds of thrust force. The conical bore 150 reduces to a finger spring bore 152 to allow preferably four finger springs 110 to fit in finger spring bore 152. Forward of finger spring bore 152 is a tool holder bore 154 of a diameter sufficient to allow a sliding fit between tool holder 106 with preferably a surface finish of 32 RMS micro inches. The length of this bore should be of such a length to maintain coaxial positioning with main body 112 and tool holder 106 during cycling. The length of this cylinder should also be of such length to provide adequate wall thickness to minimize distortion from cyclic loading. A redesign was required during testing because insufficient wall thickness allowed distortion in the prototype. The new design has been in a test environment since with no visible signs of distortion.

Engaged in main body 112 is piston 118 which is generally cylindrically formed with a closed face at the aft end and a plurality of bores on the other to accept a helical compression spring (such as a Associated Spring number C0 480-072-2250) hereafter referred to as the return spring 116, and tool holder 106. Piston 118 is preferably made from a corrosion resistant material having high tensile properties such as 303 stainless steel The piston 118 outside diameter 156 is of a sufficient diameter to provide a sliding fit with main body 112 piston bore 146. There is located in piston 118 a o-ring groove 158 to give support to a o-ring 122. The dimensions of groove should follow recognized standards for hydraulic designs of pistons and cylinders. 0-ring groove 158 is located to minimize the axial disparities between the piston 118 and main body piston bore 146 when the piston is actuated by pressure. The length of piston 118 needs to be of adequate length to allow for the length of return spring 116 and provide sufficient bearing support to maintain co-axial positioning with main body piston bore 112 during cycling of tool holder 106. Piston 118 inside profile consists of three bore transitions. The first transition is a collet contour bore 160 from the outside diameter 158 to a diameter that will fit the contour 162 of collet 114. Second is a tool holder bore 164 that will provide a sliding fit with tool holder 106 outside diameter 168 and must be long enough to allow tool holder 106 to be pushed a minimum of ⅜ inch into piston bore 164 and provide bearing support to maintain co-axial positioning with main body bore 146 when piston 118 is in the reference position. Aft of tool holder bore 164 is a return spring bore 166 of a diameter capable of accepting return spring 116 and allow for the radial expansion of return spring 116 when it is compressed.

Engaged in piston 118 is tool holder 106 which is generally cylindrical formed with a plurality of cylindrical dimensions. The largest aft outside diameter 168 is sized to provide a slip fit with piston bore 164, and is long enough to pass through collet 114 internal diameter 170, the finger springs 110 internal diameter 172, and provide adequate support to maintain co-axial alignment with main body piston bore 146 when the piston is in the fully retracted reference position. A longitudinal groove 174 extends from the aft end of tool holder piston outside diameter 168 to the forward end to allow the escape of air from the mating piston bore 164 when there is movement of tool holder 106 in piston bore 164. In addition there is a small air escape hole 176 drilled toward the forward end of longitudinal groove 174 to allow air to escape from the other internal bores in piston 118. A second cylinder projects to form a smaller outside diameter 178 that is of a diameter to allow a slip fit in the corresponding tool holder bore 154 of main body 112. Outside diameter 178 is long enough to allow the threaded outside diameter 180 of adjustment screw 108 to fit when it is in a fully retracted position, a cutting tool shank bore 182, a collet 104, and a compression nut 102. The end of tool holder outside diameter 178 has external threads 184 of sufficient size and length to allow complete engagement of compression nut 102 internal threads 186. There are a plurality internal bores. The first collet bore 188 is conical in shape and conforms to tool holding collet 104 outside diameter 190. The length of this conical profile should be long enough to allow collet 104 to fit properly, and collet nut 102 to compress collet 104 with enough force to provide secure holding of the cutting tool. Tool shank bore 182 is an extension of the conical bore 188 and is of sufficient diameter, and length to hold the shank of a cutting tool. Tool shank bore 182 transitions into a threaded adjustment screw diameter 192 that is threaded to accept the entire threaded outside diameter 180 of a adjustment screw 108. Aft of the threaded adjustment screw internal diameter 192 there is a return spring bore 194 large enough to accept return spring 116 and provide sufficient length to allow adequate capture. In addition, return spring bore 194 acts as a guide when the spring is compressed during cycling.

Located in tool holder 106 is adjustment screw 108. Adjustment screw 108 is generally round with a plurality of cylindrical dimensions. Adjustment screw 108 is preferably constructed from a corrosion resistant material having high tensile properties such as 303 stainless steel. There is a thread outside diameter 180 with threads that match tool holder 106 adjustment screw internal bore 192. There is an radial flute 196 on the forward end of adjustment thread outside diameter 180 that spans the entire diameter forming a screwdriver slot. The threaded adjustment screw outside diameter 180 transitions to a larger return spring outside diameter 198 whose diameter is equal to the outside diameter of return spring 116. The aft end of return spring outside diameter 198 also has an radial flute 199 that spans the entire diameter forming a screwdriver slot.

Collet nut 102 is generally cylindrical formed with a plurality of diameters. Collet nut 102 is preferably constructed from a corrosion resistant material having high tensile properties such as 303 stainless steel. A collet nut outside diameter 197 is of such a size to allow standard wrench flats to be formed at 180 degrees from one another and still provide enough wall thickness to accept the pressure of tightening against collet 104. There are two bores. The compression nut threaded internal diameter 186 engages the forward compression nut outside diameter 184 of tool holder 106. The length of the threads should allow full engagement of nut 102 to tool holder 106. A collet nut tool shank bore 195 is equivalent to the inside diameter 193 of collet 104. The length of this cylinder should be long enough to provide adequate wall thickness to allow tightening against collet 104 without deforming.

Figure 3:
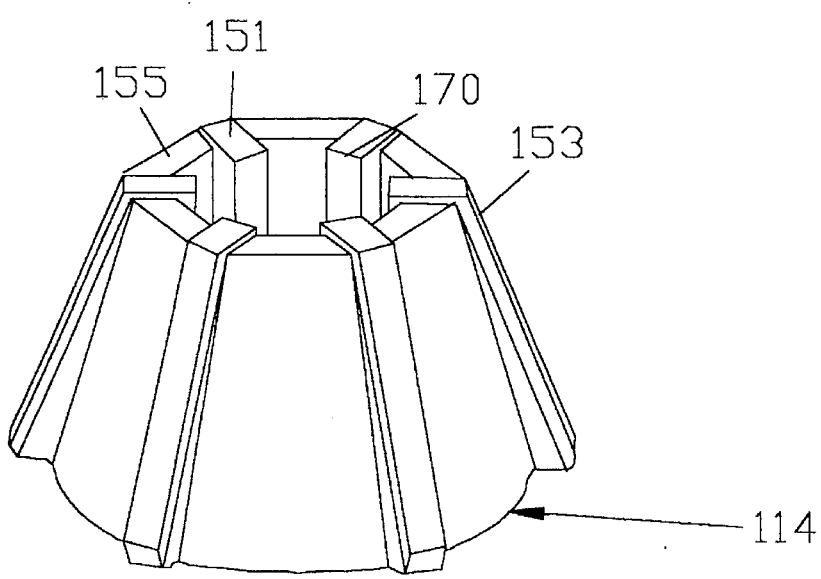
FIG. 3 is a isometric view of the collet from FIG. 2.

Referring to FIG. 3 there is shown a perspective view of main collet 114 which is typical of the Jacobs Rubber Flex Collet family. Collet 114 is has a generally conically shaped outside diameter 153 with a cylindrical inside diameter 170. Rubber Flex Collets are made from hardened steel jaws 151 encapsulated with rubber 155. The jaws encircle a tool that passes through the inside diameter 170 and clamps the tool when pressure is applied to the exterior conical diameter 153 by means of a locking tapered seat and a force mechanism.

Figures 4A, 4B:
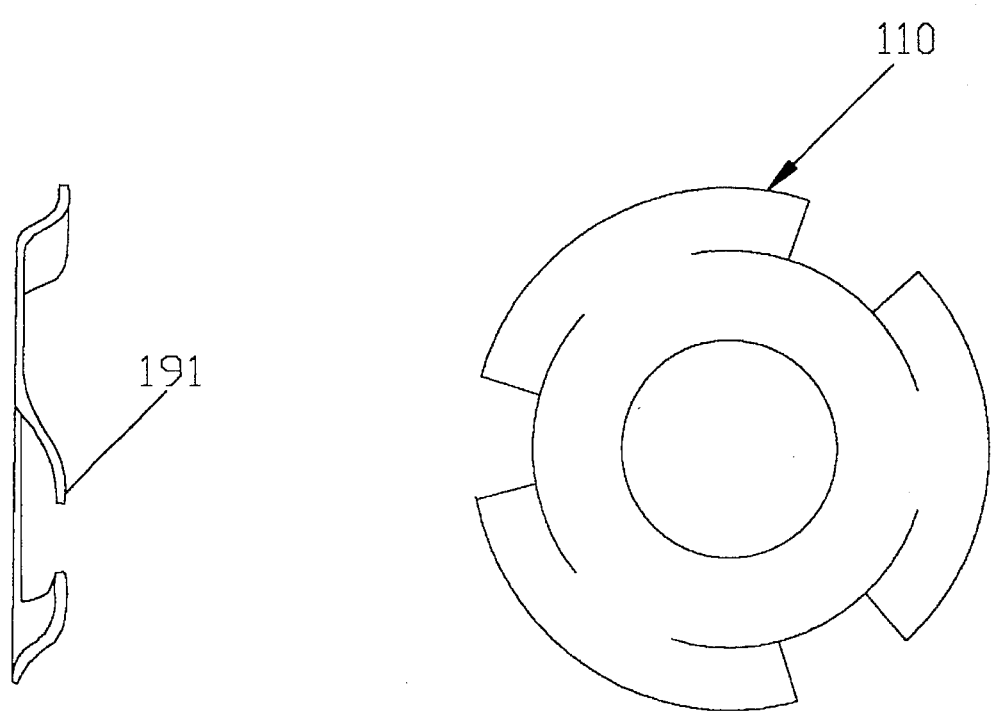
FIG. 4A is a side elevation of the finger spring from FIG. 2.
FIG. 4B is a top elevation of a finger spring from FIG. 2.

Referring to FIGS. 4A and 4B there is shown a typical finger spring similar to Associated Spring number F1555-018. The finger spring is generally annular formed with six protrusions 191 that act as cantilevered springs, and provide equal pressure around the diameter of the mating part. Finger springs 110 are made of a spring material such as standard carbon steel spring material.

Referring to FIG. 2 the method of operation is as follows. A cutting tool is held in the tool holder 106 by means of a nut 102 and collet 104. The end cap 124 fits into an internal bore 11 in the through the spindle coolant adapter 5 FIG. 1, and the coolant adapter is held in the spindle 1 FIG. 1. The cutting tool is brought into approximate contact with the surface of the part with machine tool spindle not turning. The spindle is advanced another ⅜ inch to assure contact with the surface. The coolant from the high pressure pump is activated and forces a piston 118 against a collet 114 causing friction clamping on a tool holder 106. The tool is now in the locked position, and the part surface has been located. The spindle is retracted by ½ inch and actuated. The tool is advanced to the desired depth cutting the required feature. The spindle is then retracted and the high pressure coolant is turned off. Collet return springs 110, and piston return spring 116 push main collet 114 and piston 118 to their reference position, and the tool is ready for another cycle.

Referring to FIG. 1 there is shown a second embodiment for using coolant flow to power machine tool accessories.

Coolant adapter 5 taper locating surface 12 locks into a machine tool spindle 1 receiving bore 11. A coolant adapter tubular boss 8 simultaneously locks into a coolant adapter block bore 9. Broaching attachment 200, is held in a coolant adapter bore 6 by means of a set screw 7. High pressure coolant is pumped through a coolant adapter block hose 10, the coolant then flows out of coolant adapter block bore 9 into coolant adapter 5 tubular boss 8. Coolant is routed via internal passages in coolant adapter 5 to receiving bore 6. The coolant flows into broaching attachment 200, and provides power to actuate it.

Figure 5:
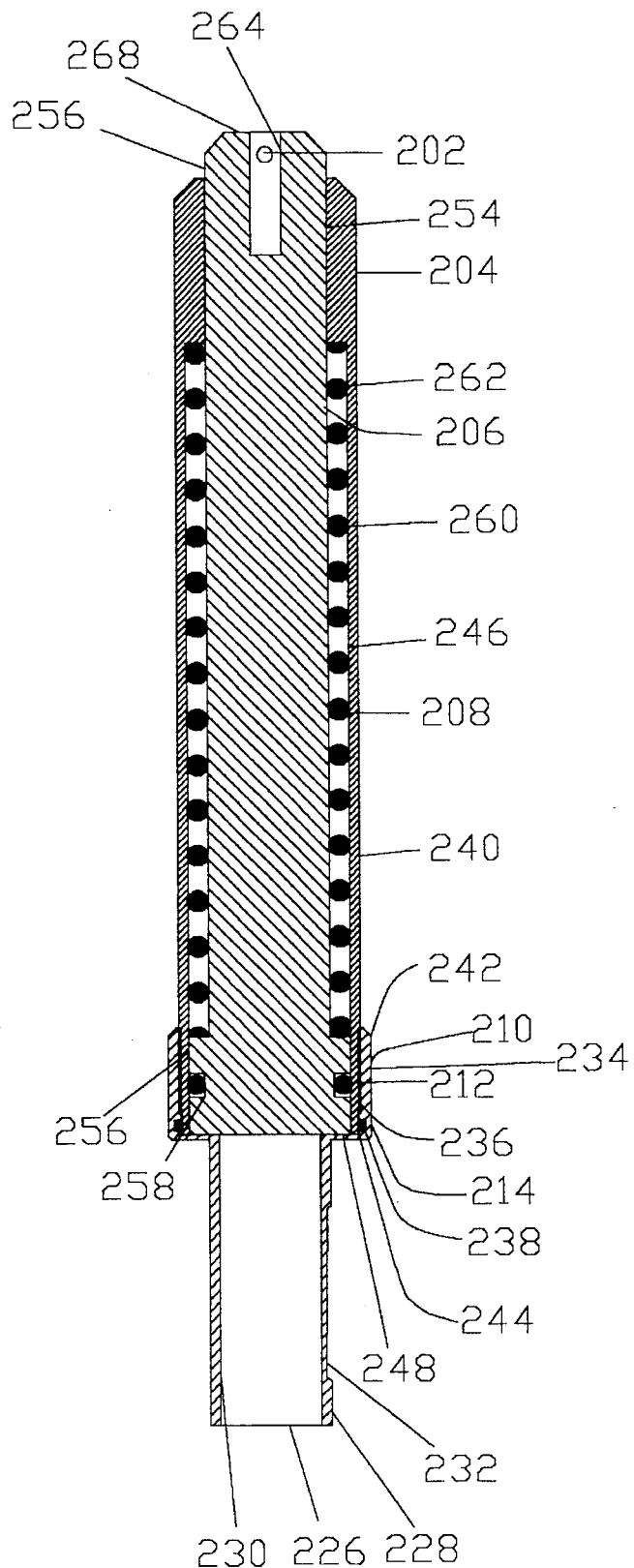
FIG. 5 is a side elevation sectional view detailing the linear motion device shown in FIG. 1.

Referring to FIG. 5 there is shown a side-elevation cross-sectional view of a broaching attachment 200. There is shown an end cap 210, a main body 204, a piston 206, and a return spring 208. As shown therein, there is end cap 210, which is preferably constructed from a corrosion resistant material having high tensile properties such as 303 stainless steel. At the aft end there is formed a tubular projection 226 with an outside diameter 228 that provides a slip fit into adapter 5 receiving bore 6 FIG. 1 and allows ingress and regress of the coolant to broaching attachment 200. The inside diameter 230 of tubular projection is of sufficient internal diameter to maximize coolant flow, but preferably maintaining a wall thickness capable of withstanding burst pressures such as 600 psi, and is of such a length to provide complete engagement into adapter 5 receiving bore 6 FIG. 1. The outside diameter has a longitudinal rectangular flat 232 that is parallel to the central axis of self compensating holder 200, and allows broaching attachment 200 to be securely held with the set screw 7 FIG. 1 in adapter 5. The flat starts preferably 0.500 from the aft end and long enough to allow the set screw 7 of adapter 5 to provide full distributed force across its complete face. Forward the end tube transitions to a larger diameter 234 that is of sufficient size to allow internal threads 236 to be formed without compromising structural integrity. Threads 236 are preferably of a length that will allow sufficient engagement to the main body 204 to provide adequate strength to withstand above mentioned pressures. There is an o-ring groove 238 located aft of threads 236 to provide sealing with the main body 204. 0-ring groove 238 will preferably follow generally accepted design procedures for hydraulic pistons and cylinders to ensure a leak proof seal between end cap 210 and main body 204. The surface finishes are preferably a maximum 125 RMS micro inches on all surfaces other than the o-ring groove 238 which is preferably a maximum 63 RMS micro inches.

Attached therein is a main body 204, which is generally formed with cylindrical dimensions. The main body 204 is preferably constructed from a corrosion resistant material having high tensile properties such as 303 stainless steel. There is an aft outside diameter 240 which has pin threads 242 that mechanically mate to end cap 210 internal threads 236. Aft of the threads 242 there is a cylindrical projection 244 that forms a compression fit with the internal sealing o-ring 214 in end cap 210. The surface finish of cylindrical projection is preferably a maximum 32 RMS to prevent damage during assembly. The main body 212 has a outside diameter 240 forward of the threads 242 of a length to allow a piston 206 and return spring 208 to be contained in the internal bores. The minimum wall thickness will be of such a thickness to preferably withstand minimum burst pressures of 600 psi. The piston bore 246 containing piston 206 is of a sufficient diameter to allow a sliding compression fit of the piston o-ring 212. This diameter preferably has a surface finish of 32 RMS. The length of the bore is of such a length to allow the piston to have sufficient movement to fully compress return spring 208, and return to the reference position against surface 248 at the aft internal bore containing end cap 210 o-ring groove 238 after the coolant flow has been turned off. Forward of piston bore 246 is a tool holder bore 254 of a diameter sufficient to allow a sliding fit between tool holder diameter 256 with preferably a surface finish of 32 RMS micro inches. The length of this bore should be of such a length to maintain co-axial positioning with main body 204 and tool holder 206 during cycling. The length of this cylinder should also be of such length to provide adequate wall thickness to minimize distortion from cyclic loading.

Engaged in main body 204 is piston 206 which is generally cylindrical formed with a closed face at the aft end. Piston 206 is preferably made from a corrosion resistant material having high tensile properties such as 303 stainless steel The piston 206 outside diameter 256 is of a sufficient diameter to provide a sliding fit with main body 204 piston bore 246. There is located in piston 206 a o-ring groove 258 to give support to a o-ring 212. The dimensions of groove should follow recognized standards for hydraulic designs of pistons and cylinders. O-ring groove 258 is located to minimize the axial disparities between the piston 206 and main body piston bore 246 when the piston is actuated by pressure. The length of piston 206 is sufficient to provide bearing support to maintain co-axial positioning with main body piston bore 246 during cycling. Piston 206 outside profile consists of one outside diameter transition. The return spring outside diameter 260 is of sufficient diameter slide easily into return spring 208 inside diameter 262, but large enough to provide support for return spring 208 while it is being compressed. At the forward end of the piston 206 there is a square tool holding recess 264 that will accept the shank of a broach. The depth of tool holding recess 264 is equal to the length of standard broach shanks. Located just aft of the front face 268 the piston 206 is located a set screw 202 to provide positive locking of a broach shank.

Referring still to FIG. 5, the broach attachment 200 is brought into proximity of the part to be broached with the spindle not rotating. The machine tool spindle axis is locked into position using its mechanical locking function. The coolant flow provided by the high pressure pump pushes piston 206 forward causing the broaching tool to form the desired feature.

Referring to FIG. 1 there is shown a third embodiment for using coolant flow to power machine tool accessories. Coolant adapter 5 taper locating surface 12 locks into a machine tool spindle 1 receiving bore 11. A coolant adapter tubular boss 8 simultaneously locks into a coolant adapter block bore 9. High speed spindle attachment 300, is held in a coolant adapter bore 6 by means of a set screw 7. High pressure coolant in pumped through a coolant adapter block hose 10, the coolant then flows out of coolant adapter block bore 9 into coolant adapter 5 tubular boss 8. Coolant is routed via internal passages in coolant adapter 5 to receiving bore 6. The coolant flows into high speed spindle attachment 300, and provides power to actuate it.

Figure 6:
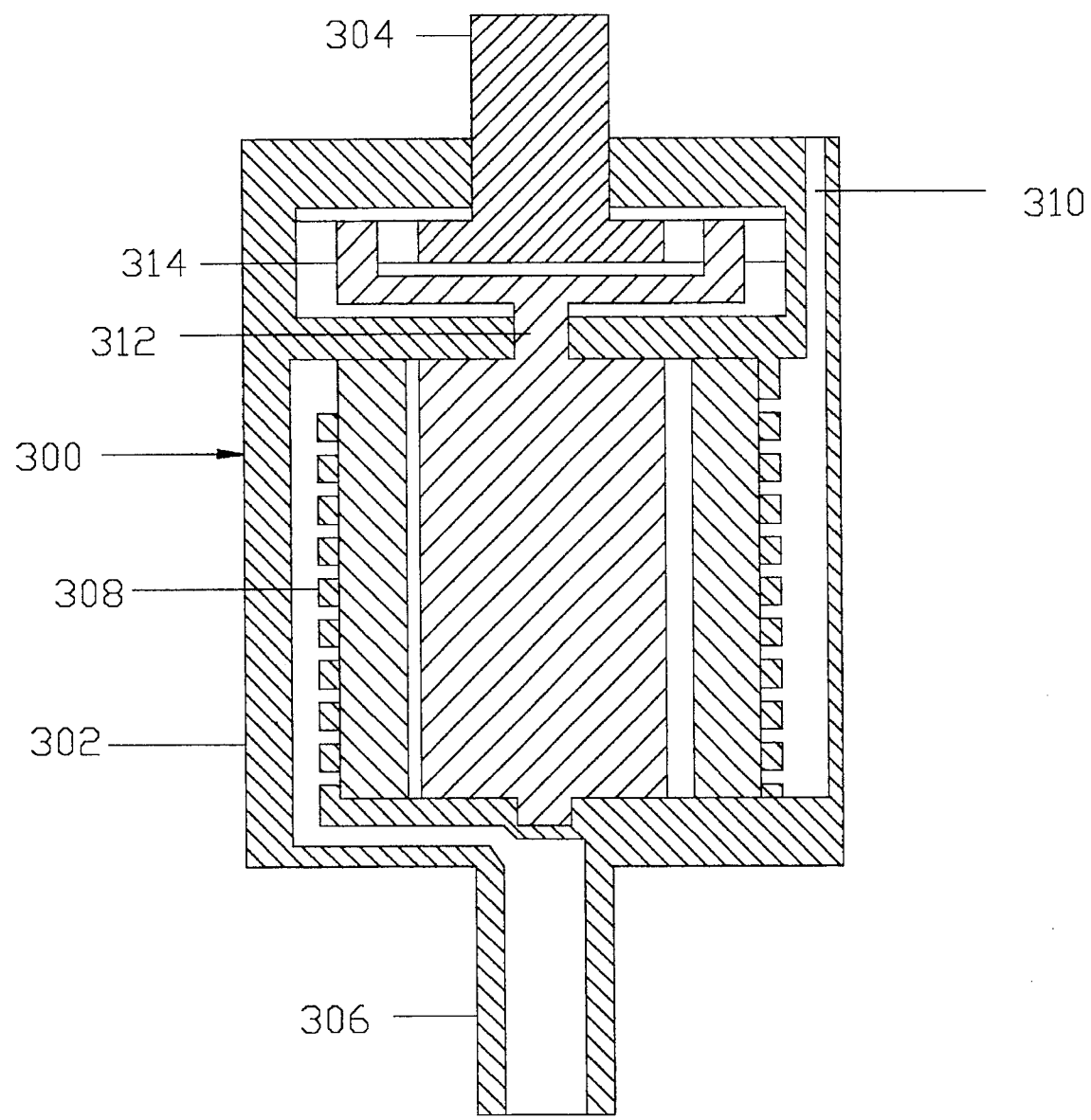
FIG. 6 is a side elevation sectional view of the high speed rotary spindle shown in FIG. 1.

Referring to FIG. 6 is shown a cut away side elevation view of a third embodiment of above mentioned invention. There is shown a conception of a high speed spindle attachment consisting of a hydraulic motor 302, a set of reduction gears 314, and a coupling unit 312.The hydraulic motor 302 is modified to fit coolant adapter 5. Attached to the output shaft of hydraulic motor 302 is reduction gears 314. The reduction gears are use to convert the low speed high torque of the hydraulic motor 302 to high speed low torque. Attached to the output shaft of reduction gears 314 is a tool holder not shown.

Referring still to FIG. 6, the high pressure coolant flow into hydraulic motor 302 causing high torque low speed rotary motion. The high torque low speed rotary input is changed to high speed low torque rotary motion by reduction gears 92. The high speed rotary motion can be used for high speed machining.

It is believed that the operation and construction of the use of coolant flow to power placed in a machine tool spindle will be apparent from the foregoing description. While methods shown or described have been characterized as being preferred, it is obvious that various changes and modifications may be made therein without departing from the spirit and scope of the invention as defined by the following claims.

What is claimed is:

1. A device for positioning a cutting tool on a machine tool for machining a part, said device comprising:

a tool holder, said cutting tool being secured to said tool holder;

means for supporting said tool holder on said machine tool such that the tool holder is axially movable relative to the machine tool; and means responsive to coolant pressure provided by the machine tool for securing the tool holder in a fixed axial position in said supporting means.

2. A device for positioning a cutting tool on a machine tool for machining a part, said device comprising:

a main body having a piston bore at a first end and a conical collet bore extending from the piston bore to a tool holder bore at a second end of said main body;

an end cap attached to the first end of said main body and closing off the piston bore of said main body, said end cap including a fluid passage in communication with the piston bore of said main body, and said end cap being attached to said machine tool;

a tool holder having a first diameter at a first end, a second diameter at a second end, and a means for securing said cutting tool at the second end, the first diameter being disposed within said main body, the second diameter slidably engaging the tool holder bore of said main body and extending from the second end of said main body, wherein said means for securing said cutting tool is disposed outside of said main body;

a collet having an outside taper matching the conical collet bore of said main body, a cylindrical internal diameter for engaging the second diameter of said tool holder, said collet being positioned with the outside taper contacting the conical collet bore of said main body and the cylindrical internal diameter contacting the second diameter of said tool holder;

piston having an outer diameter for sliding engagement with the piston bore of said main body, said piston being positioned in the piston bore of said main body with a first end of said piston facing the first end of said main body and with a second end of said piston facing said collet;

a spring having a first end contacting the second end of said piston and having a second end contacting the first end of said tool holder, wherein said spring applies opposing forces against said piston and said tool holder; and coolant pump supplying coolant flow to the fluid passage in said end cap and to said part for machining; and wherein said coolant passes through the fluid passage of said end cap forcing said piston against said collet, which forces said collet against the conical collet bore of said main body, which causes the cylindrical internal diameter of said collet to fixedly grasp the first end of said tool holder, whereby said tool holder maintains a fixed position relative to said main body.

3. The device according to claim 2, including an adapter, said adapter being attached to said machine tool and said end cap being attached to said adapter.

4. The device according to claim 2, including a second spring positioned between said collet and said main body, wherein said spring applies a force to said collet in the direction of the first end of said main body.

5. The device according to claim 2, wherein the second end of said piston includes a tool holder bore for receiving the first end of said tool holder.

6. The device according to claim 2, wherein said tool holder includes a spring bore in the first end of said tool holder, and wherein the second end of said spring engages a bottom of the spring bore.

7. The device according to claim 6, wherein said tool holder includes a threaded aperture in the spring bore bottom and a threaded spring adjustment member engaging the threaded aperture, and wherein the second end of said spring engages the threaded spring adjustment member of said tool holder.

* * * * *